(12) United States Patent
Suzuki et al.

(10) Patent No.: US 6,274,691 B1
(45) Date of Patent: Aug. 14, 2001

(54) METHOD OF PRODUCING INFLATION FILM AND SAID FILM

(75) Inventors: Yasuro Suzuki, Kisarazu; Yuki Iseki, Sodegaura, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/174,416

(22) Filed: Oct. 19, 1998

(30) Foreign Application Priority Data

Oct. 21, 1997  (JP) .................................................... 9-288371

(51) Int. Cl.$^7$ .......................... C08F 110/02; C08L 23/06; B32B 27/08
(52) U.S. Cl. .......................... 526/352; 526/160; 526/943; 525/240; 428/516
(58) Field of Search .............................. 525/240; 526/159, 526/160, 172, 131, 352; 428/516; 264/331.15, 564

(56) References Cited

U.S. PATENT DOCUMENTS

| | | | |
|---|---|---|---|
| 3,645,992 | * | 2/1972 | Elston et al. ........................ 260/80.78 |
| 4,820,471 | * | 4/1989 | Van Der Molen .................... 264/564 |
| 4,832,897 | * | 5/1989 | Van Der Molen .................... 264/564 |
| 5,272,236 | * | 12/1993 | Lai et al. .......................... 526/348.5 |
| 5,530,065 | * | 6/1996 | Farley et al. ........................ 525/240 |
| 5,575,965 | * | 11/1996 | Caronia et al. .................. 264/171.17 |
| 5,677,383 | * | 10/1997 | Chum et al. ........................ 525/240 |
| 6,063,871 | * | 5/2000 | Kishine et al. ...................... 525/240 |

FOREIGN PATENT DOCUMENTS

69863B2  2/1994  (JP) .
69864B2  2/1994  (JP) .

* cited by examiner

*Primary Examiner*—David W. Wu
*Assistant Examiner*—R. Harlan
(74) *Attorney, Agent, or Firm*—Birch, Stewart, Kolasch & Birch, LLP

(57) ABSTRACT

A method of producing an inflation film, which comprises processing an ethylene polymer or a resin composition containing said ethylene polymer in a die gap at a melting temperature of not more than 170° C., wherein said ethylene polymer is produced by an ionic polymerization method and said ethylene polymer has a density of 0.89 to 0.96 g/cm$^3$, a melting viscosity $\eta^*[170]$ at 170° C. under a shear rate of 100 rad/sec of $0.001\times10^4$ to $3.5\times10^4$ poise and a weight proportion a (% by weight) of a cold xylene-soluble portion satisfying the following formula (1):

$$a < 4.8\times10^4 \times (0.95-d)^3 + 10^6 \times (0.95-d)^4 + 0.5 \qquad \text{formula (1)}$$

(wherein a is a weight proportion (% by weight) of a cold xylene-soluble portion of the ethylene polymer and d is a density (g/cm$^3$) of an ethylene polymer).

6 Claims, No Drawings

METHOD OF PRODUCING INFLATION FILM AND SAID FILM

BACKGROUND OF THE INVENTION

1. Field of the Invention

The present invention relates to a method of producing an inflation film, which comprises processing a specific ethylene polymer or a resin composition containing said ethylene polymer at low temperature, an inflation film, and a multi-layer inflation film.

2. Description of the Related Art

Ethylene polymers have widely been used as a packaging material. To these ethylene polymers, for example, mechanical properties such as rigidity, impact strength and the like are required. As a method of improving the strength of a packaging film obtained by an inflation method, for example, a technique of processing at the temperature lower than that of a normal inflation processing by using a specific die gap is disclosed (Japanese Patent Kokoku Publication Nos. 6-9863 and 6-9864).

However, this technique is not preferred because processing at low melting temperature accompanies an increase in viscosity of the resin and an increase in loading of a processing machine and electricity consumption arises. To obtain good processability by lowering the melt density of the resin, there is disclosed that the molecular weight of the resin is lowered to improve the fluidity. In case of a High-pressure low-density polyethylene and a straight-chain low-density polyethylene, disclosed in the publications, the strength of the resulting film is drastically lowered by a decrease in molecular weight. Therefore, it is hardly to say that the mechanical strength reaches a satisfactory level.

It has recently been known that an ethylene polymer wherein the weight proportion of the cold xylene-soluble portion is small, for example, an ethylene polymer, which is produced by using a catalyst containing a transition metal compound having a group with a cyclopentadiene type anion skeleton, i.e. metallocene polymerization catalyst, exhibits excellent mechanical properties. However, such an ethylene polymer produced by using the metallocene polymerization catalyst has a problem such as fish eye at the time of film molding due to poor thermal stability because a torque at the time of processing is high to easily cause shear and heat generation.

On the other hand, high quality such as low odor, low taste or the like has been required to a food packaging material in which the ethylene polymer is widely used.

However, it is hardly to say that a film obtained by molding the conventional ethylene polymer according to a conventional processing method has odor and taste in a satisfactory level. It is generally considered that taste transferred to foods and odor of the packaging film produced by using the ethylene polymer are generated by oxidation of the molten ethylene polymer in an air and thermally decomposition of said polymer when the film is molded by the inflation molding method. One reason of odor and deterioration of taste includes additives to be added to the ethylene polymer, such as antioxidants, lubricants and the like. These additives were added for the purpose of preventing fish eye and blocking of the film, which are caused in the film at the time of processing. In a conventional technique, the addition of these additives was essential.

SUMMARY OF THE INVENTION

An object of the present invention is to provide an inflation film, which is superior in low odor, low taste transfer and mechanical properties, and a method of producing the same.

The present inventors have studied intensively about the method of producing an inflation film, which comprises processing an ethylene polymer or a resin composition containing the ethylene polymer. As a result, they have found that the object of the present invention is accomplished by processing a specific ethylene polymer or a resin composition containing said ethylene polymer in a die gap at a melting temperature lower than 170° C. Thus, the present invention has been accomplished.

That is, the present invention provides a method of producing an inflation film, which comprises processing an ethylene polymer or a resin composition containing said ethylene polymer in a die gap at a melting temperature of not more than 170° C., wherein said ethylene polymer is produced by an ionic polymerization method and said ethylene polymer has a density of 0.89 g/cm$^3$ to 0.96 g/cm$^3$, a melting viscosity $\eta^*[170]$ at 170° C. under a shear rate of 100 rad/sec of $0.001 \times 10^4$ to $3.5 \times 10^4$ poise and a weight proportion a (% by weight) of a cold xylene-soluble portion satisfying the following formula (1):

$$a < 4.8 \times 10^4 \times (0.95 - d)^3 + 10^6 \times (0.95 - d)^4 + 0.5 \quad \text{formula (1)}$$

(wherein a is a weight proportion (% by weight) of a cold xylene-soluble portion of the ethylene polymer and d is a density (g/cm$^3$) of an ethylene polymer).

The present invention also provides an inflation film obtained by the above method.

The present invention also provides a multi-layer inflation film comprising at least one layer of the inflation film obtained by the above method.

The present invention will be described in detail below.

PREFERRED EMBODIMENTS OF THE INVENTION

The ethylene polymer used in the present invention is an ethylene polymer produced by an ionic polymerization method, wherein said ethylene polymer has a density of 0.89 to 0.96 g/cm$^3$, a melting viscosity $\eta^*[170]$ at 170° C. under a shear rate of 100 rad/sec of $0.001 \times 10^4$ to $3.5 \times 10^4$ poise and a weight proportion a (% by weight) of a cold xylene-soluble portion satisfying the following formula (1):

$$a < 4.8 \times 10^4 \times (0.95 - d)^3 + 10^6 \times (0.95 - d)^4 + 0.5 \quad \text{formula (1)}$$

(wherein a is a weight proportion (% by weight) of a cold xylene-soluble portion of the ethylene polymer and d is a density (g/cm$^3$) of an ethylene polymer).

The ethylene polymer used in the present invention is a homopolymer of ethylene or a copolymer of ethylene and at least one α-olefin having 3 to 20 carbon atoms or diolefin having 4 to 20 carbon atoms, which is produced by an ionic polymerization method. Examples of the copolymer of ethylene include ethylene-α-olefin copolymer, ethylene-diolefin copolymer and ethylene-α-olefin-dioelfin copolymer.

Examples of the copolymerization component used in the present invention include propylene, butene-1, pentene-1, hexene-1, heptene-1, octene-1, nonene-1, decene-1, hexadecene-1, eicosene-1, 4-methyl-pentene-1, 4-methyl-hexene-1, vinylcyclohexane, vinylcyclohexene, styrene, norbornene, butadiene, 1,5-hexadiene, isoprene and the like.

The content of the copolymerization component is preferably from 0.05 to 50% by weight.

The ionic polymerization method in the present invention is a so-called polymerization method including coordination polymerization and cationic polymerization, and radical polymerization is excluded.

Accordingly, regarding the ethylene polymer in the invention, a low-density polyethylene (High-pressure LDPE) and an ethylene-vinyl acetate copolymer produced by a high-pressure radical polymerization method are excluded. The High-pressure LDPE produced by the high-pressure radical polymerization method is not preferred because the strength is low even if the production method of the present invention is applied.

As the ionic polymerization method, coordination polymerization is preferred. Examples of the metal component contained in the catalyst used in the coordination polymerization include zirconium, hafnium, vanadium, chrome, nickel, palladium or transition metals of lanthanum series.

The ethylene polymer used in the present invention is preferably an ethylene polymer produced in the presence of a catalyst containing said transition metal compound, particularly a catalyst containing a transition metal having a group with a cyclopentadiene type anion skeleton.

Said transition metal compound is a so-called metallocene compound and is normally represented by the general formula $ML_iX_{n-i}$ (wherein M is a transition metal atom of Group IV or lanthanum series of the Periodic Tables of the elements; L is a group having a group with a cyclopentadiene type anion skeleton, or a group having a hetero atom; a plurality of L may be crossliked each other; X is a halogen atom, hydrogen or a hydrocarbon group having 1 to 20 carbon atoms; "n" is a valence of a transition metal atom; and "i" is an integer satisfying the expression: $0<i\leq n$). The transition metal compound can be used alone or two or more kind of them can be used in combination.

Regarding said catalyst, this metallocene compounds may be used in combination with an organoaluminum compound containing an aluminum compound and/or an ionic compound such as trityl borate, anilinium borate, etc. and/or a particulate carrier including an inorganic carrier such as $SiO_2$, $Al_2O_3$, etc. and an organic polymer carrier such as olefin polymer (e.g. ethylene, styrene, etc.).

The ethylene polymer used in the present invention has a density within the range from 0.89 to 0.96 g/cm$^3$, preferably from 0.895 to 0.935 g/cm$^3$, and more preferably from 0.895 to 0.930 g/cm$^3$. When the density is smaller than 0.89 g/cm$^3$, it is not preferred the bubble stability at the time of inflation film molding is lowered. On the other hand, when the density is larger than 0.96 g/cm$^3$, it is not preferred the impact strength of the inflation film is lowered. . The density in the present invention refers to a density measured by the method defined in JIS K6760-1981.

The ethylene polymer used in the present invention has a melting viscosity $\eta^*[170]$ at 170° C. under a shear rate of 100 rad/sec within the range from $0.001 \times 10^4$ to $3.5 \times 10^4$ poise, preferably from $0.05 \times 10^4$ to $2.5 \times 10^4$ poise, more preferably from $0.1 \times 10^4$ to $2.0 \times 10^4$ poise, and most preferably from $0.5 \times 10^4$ to $2.0 \times 10^4$ poise.

When the melt viscosity is larger than $3.5 \times 10^4$ poise, it is not preferred because loading of the processing machine increases. On the other hand, when the melt viscosity is smaller than $0.001 \times 10^4$ poise, the bubble stability at the time of inflation film molding and the impact strength of the processed film is lowered.

The melt viscosity $\eta^*[170]$ at 170° C. under a shear rate of 100 rad/sec refers to a value obtained by measuring under the following conditions.

(1) Apparatus: Reometrics Mechanical Spectrometer RMS-800, manufactured by Reometrics Co.

(2) Geometry: parallel plate, diameter: 25 mm, plate distance: 1.5 to 2 mm (3) Strain: 5%

(4) Frequency: 100 rad/sec (5) Temperature: 170° C.

The ethylene polymer used in the present invention is an ethylene polymer wherein the weight proportion a (% by weight) of the cold xylene-soluble portion satisfies the formula (1), preferably the formula (2), and more preferably the formula (3). When the weight proportion a (% by weight) of the cold xylene-soluble portion does not satisfy the formula (1), it is not preferred the mechanical strength of the inflation film is lowered and the effect of reducing odor is small.

$$a<4.8\times10^4\times(0.95-d)^3+10^6\times(0.95-d)^4+0.5 \quad \text{formula (1)}$$

$$a<4.8\times10^4\times(0.95-d)^3+10^6\times(0.95-d)^4+0.3 \quad \text{formula (2)}$$

$$a<4.8\times10^4\times(0.95-d)^3 \quad \text{formula (3)}$$

(wherein a is a weight proportion (% by weight) of a cold xylene-soluble portion of the ethylene polymer and d is a density (g/cm$^3$) of the ethylene polymer).

The cold xylene-soluble portion in the present invention refers to that measured by the method defined in code of federal regulation of U.S.A., Food and Drugs Administration §175.1520.

The ethylene polymer used in the present invention may be replaced by a resin composition containing said ethylene polymer and, if necessary, various other resins. Examples of the other resin include olefin resins such as High-pressure low-density polyethylene for the purpose of improving the melt tension and transparency, high-density polyethylene for the purpose of improving the rigidity and low-density elastomer for the purpose of improving the impact strength, and these components can be used alone or in combination thereof.

Regarding the formulation ratio, the amount of said ethylene polymer is preferably at least 50% by weight, and more preferably not less than 70% by weight.

The ethylene polymer or resin composition containing said ethylene polymer used in the present invention is molded into a film by a so-called inflation processing method of extruding a melt through an annular die, blowing a fixed volume of an air into the melt to expand it, and hauling-off at a fixed rate by a haul-off equipment with air-cooling outside using a blower.

The present invention is characterized by processing the ethylene polymer or resin composition containing said ethylene polymer in a die gap at a melting temperature of not more than 170° C., preferably not more than 150° C., more preferably not more than 135° C., and most preferably than 125° C. When the melt temperature exceeds 170° C., it is not preferred the bubble stability at the time of inflation film molding is poor and odor and taste of the inflation film are deteriorated.

The melting temperature in the die gap in the present invention refers to a temperature of a molten resin of at least one point within the range from the portion immediately before a die inlet, after the resin was extruded from an extruder, to the portion immediately after a die outlet. The lower limit of the melting temperature in the die gap is preferably higher than a solidification temperature of the ethylene polymer or resin composition containing said ethylene polymer. The term "solidification temperature" used herein refers to a temperature at which a portion of said molten ethylene polymer is recrystallized, and varies depending on the cooling and shear conditions. An index of the solidification temperature includes a maximum crystallization temperature. The maximum crystallization temperature refers to a highest temperature among a crystallization peak temperature, which is measured by charging 10 mg of a sample in an aluminum pan, allowing to stand at 150° C. for 2 minutes and cooling to 40° C. at a cooling rate of 5° C./min. The solidification temperature at the time of melt extrusion molding is generally lower than the maximum crystallization temperature by several degrees to several tens degrees.

To the ethylene polymer or resin composition containing said ethylene polymer used in the present invention, one or more antioxidants may be added to prevent oxidation. In the present invention, processing can also be performed by adding no antioxidant or reducing the amount in comparison with the amount as usual because the processing temperature is low. The smaller the amount of the antioxidant is, the better odor and taste obtained after being processed into a film is. The total amount of the antioxidant is preferably not more than 0.5% by weight, more preferably not more than 0.1% by weight, and most preferably not more than 0.05% by weight.

Regarding this antioxidant, a primary antioxidant having a phenol skeleton and a secondary antioxidant containing a phosphorous compound are preferably used in combination.

The inflation film produced according to the present invention may be a single-layer inflation film, or a multi-layer inflation film comprising at least one layer obtained by the present inflation film.

When the production method of the present invention is applied to the multi-layer inflation film, it may be applied to the production of all layers or applied to the production of at least one layer of the multi-layer film. When the production method of the present invention is applied to at least one layer of the multi-layer film, it is easily to process by using stack die. The method may be applied to the inner surface or outer surface layer, but it is preferably to be applied to an inner layer inside the surface. The single-layer or multi-layer film thus produced may be used as a sealant film for dry laminate processing on a substrate such as other polymer films.

As described above, according to the present invention, there can be provided an inflation film, which is superior in low odor, low taste transfer and heat resistance and is specifically superior in mechanical properties, and a method of producing said film.

The present invention can also provide an inflation film and a method of producing the same, wherein the amount of antioxidant used is smaller than that of the prior art, or the antioxidant is not used at all.

Furthermore, the inflation film of the present invention is suitable for a packaging material, particularly food packaging material, because of its excellent characteristics as described above.

EXAMPLES

The following Examples further illustrate the present invention in detail but are not to be construed to limit the scope thereof.

The evaluation method was as follows.
(1) Melting temperature in die gap

The resin temperature at a die outlet was measured by using a thermocouple while the ethylene polymer was extruded at a set processing temperature.
(2) Odor A sample film (30 $\mu$m, 700 $cm^2$) was put in a wide-mouthed glass bottle (1 liter), heated in an oven at 80° C. for 1 hour and cooled. Then, odor was compared by using an organoleptic test according to the following criteria.

X: Odor is stronger than Comparative Example 6 as a blank.

Δ: Odor is the same as the blank.

○: Odor is weak.

⊙: Odor is very weak.
(3) Taste

A sample film (30 $\mu$m, 1200 $cm^2$) was dipped in a wide-mouthed glass bottle (1 liter) containing 500 cc of water, heated in an oven at 80° C. for 1 hour and cooled. Then, taste was compared by using an organoleptic test according to the following criteria.

X: Taste is stronger than Comparative Example 6 as a blank.

Δ: Taste is the same as the brank.

○: Taste is weak.
(4) Falling weight impact strength

It was measured by the method defined in ASTM D710.
(5) Current value

The current value of an extruder required to extrude a molten resin. High current value means high extrusion loading and the current value is preferably not more than 50 A in case of the extruder used in the Examples.

Ethylene Polymer Manufactured by Using Metallocene Catalyst

Sumikasen E FV402 (metallocene PE1: density=0.915 $g/cm^2$, MI=4 g/10 minutes), FV403 (metallocene PE2: density=0.919 $g/cm^2$, MI=4 g/10 minutes) and FV404 (metallocene PE3: density=0.928 $g/cm^2$, MI=4 g/10 minutes) as vapor phase-produced metallocene PE manufactured by Evolue Japan Co., Ltd. were used.

Preparation of Ethylene Polymer Using Ziegler-Natta Catalyst

Ziegler-Natta PE1: Neozex 3510 manufactured by Mitsui Petrochemistry Co., Ltd. was used.

Ziegler-Natta PE2: A solid component was obtained by reacting porous styrene-divinylbenzene copolymer particles with tetrabutoxytitanium and tetraethoxysilane in toluene and reacting the product with butylmagnesium chloride to obtain a solid component. Furthermore, another solid component obtained by reacting said solid component with diisobutyl phthalate in toluene was reacted with butyl ether and titanium tetrachloride to obtain a solid catalyst component. Said solid catalyst and triethylaluminum were reacted with ethylene in butane to perform preliminary polymerization, thereby obtaining a preliminary polymerized catalyst.

Using a continuous fluidized bed vapor phase polymerization device, a mixed gas of ethylene and hexene-1 was reacted with this preliminary polymerized catalyst and triethylaluminum to obtain an ethylene-hexene-1 copolymer. The density of the ethylene-hexene-1 copolymer was adjusted by the concentration ratio of ethylene to hexane-1 and the molecular weight was adjusted by the concentration of hydrogen to be introduced to obtain an ethylene polymer by using the Ziegler-Natta catalyst, respectively. To the polymer thus obtained, 620 ppm of Irganox 1076 manufactured by Ciba Speciality Chemicals Co., Ltd., 1000 ppm of Irganox 168 manufactured by Ciba Speciality Chemicals Co., Ltd. and 1000 ppm of calcium stearate were added, and the mixture was melt-extruded, water-cooled and then cut into pellets. High-pressure LDPE Sumikasen L716H manufactured by Sumitomo Chemical Industries Co., Ltd., produced by the high pressure radical polymerization method, was used.

Examples 1 to 3 and Comparative Examples 1 to 6

Using the ethylene polymer shown in Table 1, an inflation film was produced under the processing conditions shown in Table 1 and below.

(1) Apparatus: K-40R inflation processing machine manufactured by Placo Co., Ltd.
(2) Setting temperature: The extrusion cylinder and die were set to the temperature shown in the column of the processing temperature of Table 1.
(3) Die: 125 mm ø, gap: 2 mm
(4) Extrusion amount: 23 kg/hour
(5) Film thickness: 30 μm
(6) Blow-up ratio: 1.8

The resulting film was evaluated. The results are also shown in Table 1.

The following fact has been found from the results of the Examples and Comparative Examples.

When an ethylene polymer having a melt density $\eta^*[170]$ of $1.6 \times 10^4$ poise, a density of 0.915 g/cm$^3$ and 0.919 g/cm$^3$ and a weight proportion of the cold xylene-soluble portion of 1.0% by weight, and an ethylene polymer having a density of 0.928 g/cm$^3$ and a weight proportion of the cold xylene-soluble portion of 0.8% by weight are processed into a film at a processing temperature of 120 and 130° C. (Examples 1 to 3), an extrusion torque at the time of processing is sufficient and a film having low odor and taste and remarkably high impact strength was obtained, respectively. On the other hand, when the same resin was processed in a die gap at the melting temperature higher than 170° C. (Comparative Examples 1 and 2), the level of odor and taste was lowered.

When an ethylene polymer polymerized by using a Ziegler-Natta catalyst, which does not satisfy the formula (1), is processed into a film in a die gap at a melting temperature of not less than 170° C. (Comparative Example 3), a film having poor odor and taste and low impact strength was obtained.

When an ethylene polymer polymerized by using a Ziegler-Natta catalyst, wherein the weight proportion of the cold xylene-soluble portion exceeds 8%, is processed into a film in a die gap at a melting temperature of not less than 170° C. (Comparative Example 4), a film having poor odor and taste and low impact strength was obtained. The impact strength can be improved to some degree by increasing the molecular weight. In this case, it is not preferred loading of a processing machine is further increased by an increase in melt viscosity at the time of processing.

When High-pressure LDPE, which does not satisfy the formula (1), is processed into a film in a die gap at a melting temperature of not less than 170° C. (Comparative Example 5), a film having poor odor and taste and low impact strength was obtained.

When High-pressure LDPE is processed into a film in a die gap at a melting temperature of not less than 120° C. (Comparative Example 6), there was obtained a film wherein poor odor and taste were partially improved but the

TABLE 1

| | | Characteristics of ethylene polymer | | | | Processing conditions | | | Performances of film | | |
|---|---|---|---|---|---|---|---|---|---|---|---|
| | Resin | Melt viscosity [170] (Poise) | Density (g/cm$^3$) | Cold xylene-soluble portion (wt %) | Maximum crystallization temperature (° C.) | Processing temperature (° C.) | Die gap melting temperature (° C.) | Current value (A) | Odor | Taste | Falling weight impact strength (g) |
| Example 1 | Metallocene PE2 | $1.6 \times 10^4$ | 0.919 | 1.0 | 113 | 130 | 137 | 46 | ⊙ | ○ | 1030 |
| Example 2 | Metallocene PE1 | $1.6 \times 10^4$ | 0.915 | 1.0 | 111 | 120 | 127 | 45 | ⊙ | ○ | >3700 |
| Example 3 | Metallocene PE3 | $1.6 \times 10^4$ | 0.928 | 0.8 | 117 | 130 | 134 | 45 | ⊙ | ○ | 350 |
| Comparative example 1 | Metallocene PE2 | $1.6 \times 10^4$ | 0.919 | 1.0 | 113 | 180 | 185 | 30 | Δ | Δ | 1510 |
| Comparative example 2 | Metallocene PE1 | $1.6 \times 10^4$ | 0.915 | 1.0 | 111 | 170 | 185 | 30 | ○ | Δ | >3700 |
| Comparative example 3 | Ziegler-Natta PE1 | $2.1 \times 10^4$ | 0.935 | 0.8 | 117 | 170 | 176 | 48 | X | X | 180 |
| Comparative example 4 | Ziegler-Natta PE2 | $2.6 \times 10^4$ | 0.920 | 8 | 117 | 180 | 185 | 25 | X | X | 220 |
| Comparative example 5 | LDPE | $0.4 \times 10^4$ | 0.920 | 3.5 | 99 | 170 | 175 | 29 | X | X | 90 |
| Comparative example 6 | LDPE | $0.4 \times 10^4$ | 0.920 | 3.5 | 99 | 120 | 126 | 38 | Δ | Δ | 100 | impact strength is lower than that of polyethylene having the same density obtained by using the Ziegler-Natta catalyst or metallocene catalyst.

What is claimed is:

1. A method of producing an inflation film, which comprises processing a polymer consisting essentially of ethylene or a resin composition consisting essentially of said ethylene polymer and high-pressure low-density polyethylene in a die gap at a melting temperature of not more than 170° C., wherein said ethylene polymer is produced by an ionic polymerization method and said ethylene polymer has a density of 0.89 to 0.96 g/cm$^3$, a melting viscosity $\eta^*(170)$ at 170° C. under a shear rate of 100 rad/sec of $0.001 \times 10^4$ to $3.5 \times 10^4$ poise and a weight proportion a (% by weight) of a cold xylene-soluble portion satisfing the following formula (1):

$$a < 4.8 \times 10^4 \times (0.95-d)^3 + 10^6 \times (0.95-d)^4 + 0.5 \qquad \text{formula (1)}$$

wherein a is a weight proportion (% by weight) of a cold xylene-soluble portion of the ethylene polymer and d is a density (g/cm$^3$) of an ethylene polymer.

2. The method according to claim 1, wherein the ethylene polymer is produced in the presence of a catalyst containing a transition metal compound having a group with a cyclopentadiene type anion skeleton.

3. An inflation film obtained by the method according to claim 1.

4. An inflation film obtained by the method according to claim 2.

5. A multi-layer inflation film comprising at least one layer of the inflation film obtained by the method according to claim 1.

6. A multi-layer inflation film comprising at least one layer of the inflation film obtained by the method according to claim 2.

* * * * *